Patented June 20, 1933

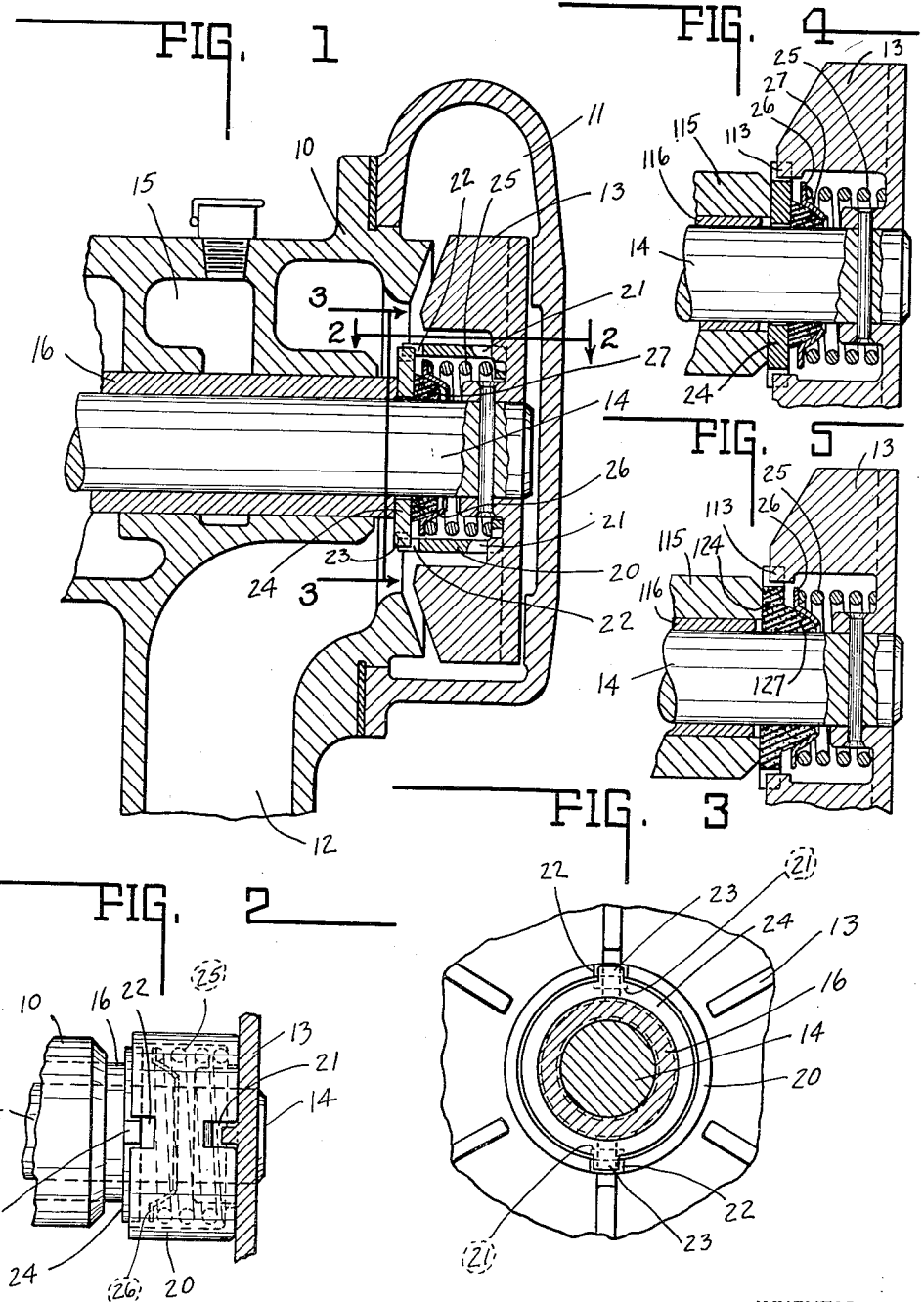

1,914,759

UNITED STATES PATENT OFFICE

LOUIS SCHWITZER AND CARL J. WINKLER, OF INDIANAPOLIS, INDIANA, ASSIGNORS TO SCHWITZER-CUMMINS COMPANY, OF INDIANAPOLIS, INDIANA, A CORPORATION

PACKING FOR ROTATING SHAFTS

Application filed March 21, 1931. Serial No. 524,320.

This invention relates to a packing for a rotating shaft particularly adaptable for use in water pumps, gas compressors and the like, and is an improvement upon the structure disclosed in my prior application, Serial No. 511,158, filed January 26, 1931 now Patent No. 1,859,012, issued May 17, 1932.

The principal object of the invention is to provide a packing structure of such a character as to continuously maintain a packing sealed with the shaft, the packing being driven with the shaft so as to avoid relative rotation between the shaft and packing, while permitting ready removal of the packing structure for replacement or other purposes.

It is the purpose of this invention to provide a packing structure of the above character which will accommodate itself to a misalignment or eccentric rotation of the shaft without disturbing the contact of the sealing surfaces. This is accomplished by providing a "sloppy" fit or universal drive directly between the shaft and the sealing ring so that the sealing ring is driven substantially in the plane of its sealing surface. This eliminates the tendency to lift the sealing ring or surface out of sealing contact when the shaft is slightly out of alignment so as to impart an eccentric motion which, in turn, may cause a wobbling or lifting of the sealing ring.

The particular feature of the invention resides in the provision of a sealing ring which surrounds the drive shaft and bears directly against the end of the bearing of said shaft so as to effect a seal therewith, said ring being rotatable in respect thereto. The ring, rotated by the shaft, is driven through a sloppy or universal connection directly in the plane of its sealing surface by a sleeve which, in turn, is driven by the shaft, whereby the sealing ring will not be directly affected by variations in alignment or eccentricity of said shaft. Further sealing of the shaft is effected by a compressible and flexible rubber packing which bears against or is secured to the sealing ring and provides a seal between said ring and the shaft, as well as maintain said ring in sealing contact with the end of the bearing under spring pressure, in such manner as to permit relative movement between the compression spring and the rubber packing to accommodate for misalignment.

The full nature of the invention will be understood from the accompanying drawing and the following description and claims.

Fig. 1 is a central vertical section through a portion of a water pump and the packing. Fig. 2 is a view showing a plan view of the packing taken from line 2—2 of Fig. 1. Fig. 3 is a section taken on the line 3—3 of Fig. 1. Fig. 4 is a modified form showing a portion of the structure in central vertical cross section. Fig. 5 is the same as Fig. 4 showing a second modified form.

In the drawing there is shown a pump housing 10 having an inlet 12 and outlet 11, said housing enclosing an impeller 13 keyed to the shaft 14. The housing is provided with a bearing in which the shaft is rotatably mounted.

For preventing the fluid or the like which passes through the pump housing, from escaping into the bearing and prevent the escape of oil contained in the oil reservoirs 15 communicating with the bearing through the bushing 16, there are provided packing structures adjacent the bearing. Similar packing structures may be mounted on the opposite side of said bearing for preventing the escape of oil to the exterior portions of the shaft.

The packing structure comprises a cylindrical sleeve 20 provided with recesses 21 in one end thereof adapted to embrace the blades of the impeller 13, whereby said sleeve would be caused to rotate with said impeller and shaft and may be readily disengaged and removed therefrom. Said sleeve surrounds the shaft in spaced relation thereto and extends toward the bushing 16. The opposite end of the sleeve is provided with similar recesses 22 into which projections 23 extend radially from the periphery of the sealing ring 24. Said sealing ring is mounted about the shaft 14 and slightly spaced therefrom in position to bear against the adjacent end of the bushing 16 or bearing proper and effect a seal therewith.

The projections 23 of said ring are smaller than the recesses 22 so as to provide a sloppy fit therebetween. By reason thereof, the sealing ring will be driven by the sleeve 20, but will not be affected by any cocking, misalignment or eccentric action thereof. Thus, regardless of any misalignment or eccentricity of the shaft 14 which may be imparted to the driving sleeve 20, the sealing ring 24 would not be affected thereby so as to maintain its proper sealing relation with the end of the bushing 16.

Surrounding said shaft and mounted within the sleeve 20, there is a compression spring 25 that bears against the impeller 13 at one end thereof, and at the other end thereof bears against the universal pressure plate 26 which, in turn, bears against the rubber packing 27 and forces the same downwardly against the shaft 14 and forwardly against the sealing ring 24 for maintaining it in sealing relation with the bushing 16. It will be noted that the bearing plate 26 engages the packing at an angle so as to force it in both directions to maintain a seal between both the shaft and ring, the rubber packing being adapted to yield or give so as not to affect the proper sealing position of the sealing ring.

By means of this construction, regardless of any misalignment or eccentricity of the driving shaft, no cocking action or improper movement will be transmitted thereby to the sealing ring which at all times will be maintained in its proper sealing position.

In the modified form shown in Fig. 4 the sleeve 20 is eliminated and the sealing ring 24 is driven directly from a projection 113 upon one or more of the impeller blades 13. As shown herein, the sealing ring bears directly against and seals with the end of the cast iron portion 115 of the bearing, as distinguished from that portion of the bearing comprising the bushing 16 as shown in Fig. 1. As shown in Fig. 4, the bushing 116 is relatively thin and has its ends spaced from the sealing ring 24.

In the modified form shown in Fig. 5, the sealing ring 124 is formed of rubber integral with the rubber packing portion 127, the rubber sealing ring bearing directly against and having sealing contact with the end of either the cast iron portion 115 or bushing portion 116 of the bearing.

The invention claimed is:

1. The combination with a rotatable shaft and a bearing in which said shaft is adapted to rotate, of a packing structure therefor comprising a sealing ring rotatable with said shaft in sealing relation with the end of the bearing, a driving sleeve surrounding said shaft and driven thereby, a loose tongue and groove driving connection between said sleeve and sealing ring, a packing ring contained within said sleeve having one face bearing against the opposite side of the sealing ring from said bearing, another surface bearing against the periphery of said shaft and a truncated conical outer surface, a packing plate having a corresponding surface in engagement therewith, and a compression spring in engagement with said plate for forcing said packing ring inwardly and forwardly against said shaft and sealing ring respectively, whereby said packing will permit relative axial movement between said ring and shaft.

2. The combination with a rotatable shaft and a bearing in which said shaft is adapted to rotate, of a packing structure surrounding said shaft in position to abut the end of said bearing for effecting a seal therewith and with the surface of said shaft, a rearwardly protruding surface having a curved portion formed thereon, a follower ring having a curved surface conforming with the surface of said packing structure, and a spring for forcing said follower ring against said packing structure to yieldingly maintain the same in sealing relation with said shaft and bearing and conform to any misalignment therebetween.

In witness whereof, we have hereunto affixed our signatures.

LOUIS SCHWITZER.
CARL J. WINKLER.